(12) United States Patent
Wong et al.

(10) Patent No.: US 6,363,077 B1
(45) Date of Patent: Mar. 26, 2002

(54) LOAD BALANCING IN LINK AGGREGATION AND TRUNKING

(75) Inventors: David Wong, Campbell; Cheng-chung Shih, Fremont; Jun Cao, San Leandro; William Dai, San Jose, all of CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 09/249,837

(22) Filed: Feb. 12, 1999

Related U.S. Application Data
(60) Provisional application No. 60/074,740, filed on Feb. 13, 1998.

(51) Int. Cl.$^7$ ............................................. H04L 12/56
(52) U.S. Cl. ..................... 370/422; 370/232; 370/392
(58) Field of Search ............................ 370/229, 230, 370/232, 468, 351, 392, 445, 446, 389, 422, 423; 709/105, 226

(56) References Cited
U.S. PATENT DOCUMENTS

| | | | | |
|---|---|---|---|---|
| 5,119,367 A | * | 6/1992 | Kawakatsu et al. | 370/232 |
| 5,680,396 A | * | 10/1997 | Morimoto et al. | 370/392 |
| 6,081,511 A | * | 6/2000 | Carr et al. | 370/256 |
| 6,108,306 A | * | 8/2000 | Kalkunte et al. | 370/235 |

* cited by examiner

Primary Examiner—Chau Nguyen
Assistant Examiner—D. Trinh
(74) Attorney, Agent, or Firm—Arent Fox Kintner Plotkin & Kahn PLLC

(57) ABSTRACT

A communications network switch includes a plurality of network ports for transmitting and receiving packets to and from network nodes via network links, each of the packets having a destination address and a source address, the switch being operative to communicate with at least one trunking network device via at least one trunk formed by a plurality of aggregated network links. The communications network switch provides a method and apparatus for balancing the loading of aggregated network links of the trunk, thereby increasing the data transmission rate through the trunk. The switch includes: a packet buffer for temporarily storing a packet received at a source port of the network ports, the packet having a source address value, and a destination address value indicating a destination node that is communicatively coupled with the switch via a data path including a trunk; a packet routing unit for determining a destination trunked port associated with the packet, the destination trunked port including a subset of the plurality of network ports, the destination trunked port being coupled to the destination node via the data path; and load balancing unit for selecting a destination port associated with the packet from the subset of network ports; whereby transmission loading of the aggregated network links of the trunk is balanced. In varying embodiments, the load balancing unit is operative to select destination ports from the subsets of network ports as a function of source port ID values, source addresses, and destination addresses.

17 Claims, 9 Drawing Sheets

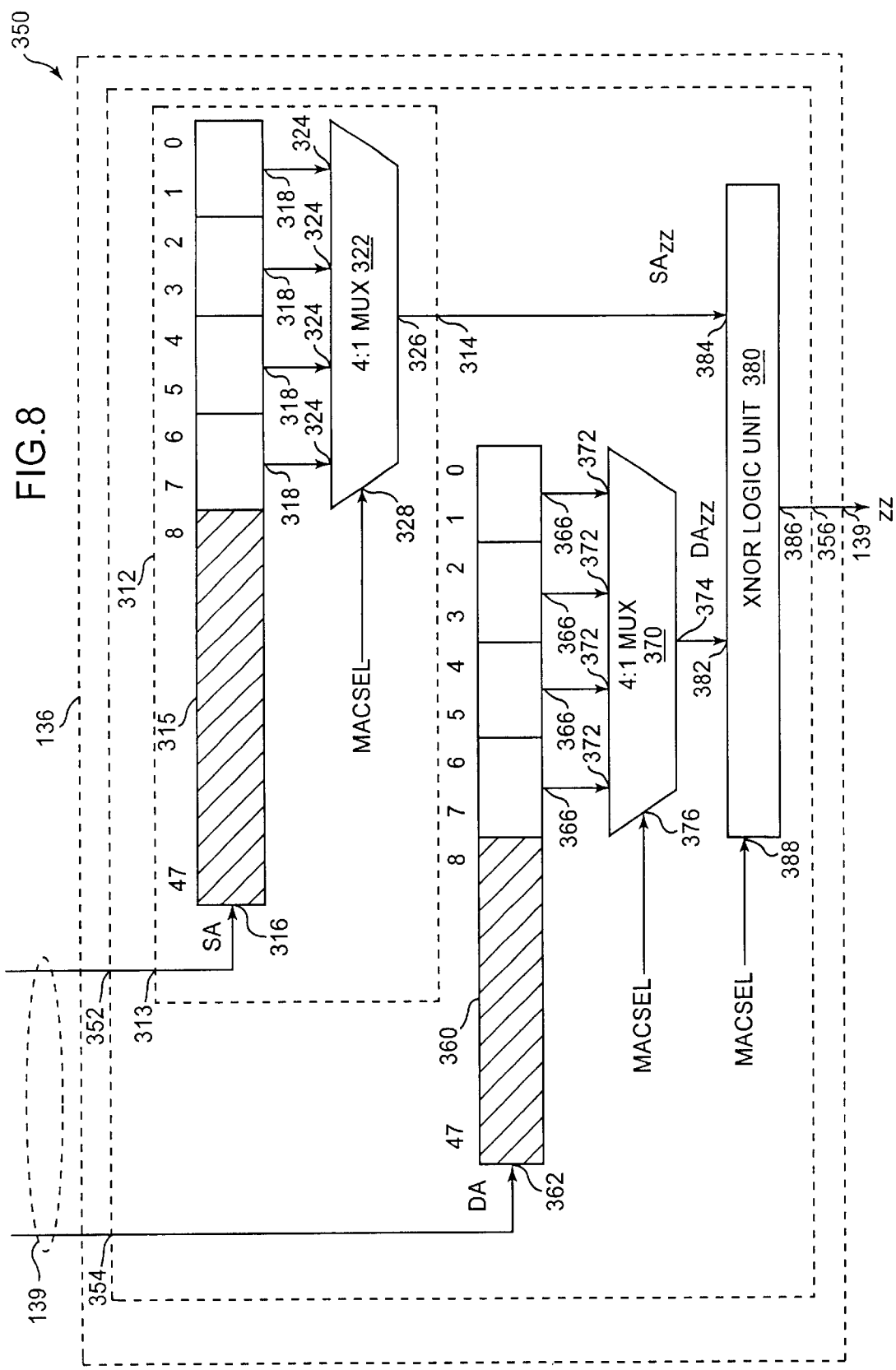

LOAD BALANCING IN LINK AGGREGATION AND TRUNKING

CROSS REFERENCE TO RELATED APPLICATIONS

This application claims priority to U.S. patent application Ser. No. 60/074,740, filed Feb. 13, 1998, entitled "Methods For Load Balancing In Link Aggregation And Trunking", which is incorporated herein by reference.

BACKGROUND OF THE INVENTION

1. Field of the Invention

The present invention relates generally to computer network systems. More specifically, the present invention relates to a method and apparatus for balancing the loading of network links of a trunked link.

2. Description of the Prior Art

Personal computers and engineering workstations are commonly inter-coupled into local area networks (LANs) that allow messages to be sent and programs to be downloaded, e.g., from file servers on the LAN. The ETHERNET, originally a joint effort of Intel, Xerox and Digital Equipment Corporations, is an example of a shared-access LAN now in widespread use. The ETHERNET was originally conceived as a ten megabit per second (Mbps) network that allowed every node on the LAN to transmit and receive.

Faster engineering workstations and distributed file systems have seriously increased the traffic placed on ordinary LANs. Many variations in ETHERNET have been developed. Different kinds of ETHERNET are referred to as "10BASE-T", "10BASE-2 ", "10BASE-5 ", "100BASE-VG", and "100BASE-X". Different speeds include ten Mbps, twenty Mbps, one hundred Mbps, and beyond. The ETHERNET 100 BaseFX specification defines transmission over fiber optic cable. 1 Gbit per second ETHERNET Servers are typically at the focus of network activity and are often subjected to parallel access requests from clients which have the same data transfer speed limitations as the server itself.

High performance computers are becoming affordable for use in applications including computing resources, high-performance file servers, and visualization workstations. However, the LANs that are now in use do not provide the capacity that is needed to support these higher performance computers. While bandwidths in the 10–100 Mbps range are sufficient for many applications, the more demanding computing and visualization applications require gigabit-per-second (Gbps) data transfer rates. Such applications include high-quality video applications, live video links, and meeting-support systems. Some of these applications, such as real-time video, will place a more continuous load on the network and require one-to-many ("multicasting") transmission in addition to point-point ("unicast") links. Therefore, a reasonable assumption is that LANs may soon require aggregate bandwidths in the 10–40 Gbps range for supporting a more or less ordinary community of users simultaneously. Different user communities typically have different needs, and the requirements of any given user community generally expand over time, so there is a need for a high performance LAN that scales gracefully and economically to satisfy the requirements of its user community.

ETHERNET switching provides for the connection of multiple ETHERNET LANs to a central switch. Within the ETHERNET switch, circuit switching allows the simultaneous transport of multiple packets across the switch.

What is needed is a local network switch including a plurality of network ports for transmitting and receiving packets to and from network nodes via network links, each of the packets having a destination address and a source address, the switch being operative to communicate with at least one trunking network device via at least one trunk formed by a plurality of aggregated network links.

SUMMARY OF THE INVENTION

It is an object of the present invention to provide a method an apparatus for load balancing in trunked links.

Briefly, a presently preferred embodiment of the present invention includes a local area network switch including a plurality of network ports for transmitting and receiving packets to and from network nodes via network links, each of the packets having a destination address and a source address, the switch being operative to communicate with at least one trunking network device via at least one trunk formed by a plurality of aggregated network links. The present invention provides a method and apparatus for balancing the loading of the aggregated network links of the trunk, thereby increasing the data transmission rate through the trunk.

The switch includes: a packet buffer for temporarily storing a packet received at a source port of the network ports, the packet having a source address value, and a destination address value indicating a destination node that is communicatively coupled with the switch via a data path including a trunk; a packet routing unit for determining a destination trunked port associated with the packet, the destination trunked port including a subset of the plurality of network ports, the destination trunked port being coupled to the destination node via the data path; and a load balancing unit for selecting a destination port associated with the packet from the subset of network ports; whereby transmission loading of the aggregated network links of the trunk is balanced.

In a port-based load balancing embodiment of the present invention, the load balancing unit is responsive to a source port ID value indicating the source port, and is operative to select the destination port as a function of the source port ID value.

In accordance with a first MAC address based load balancing embodiment of the present invention, the load balancing unit is responsive to the source address value of the packet, and is operative to select the destination port as a function of the source address value. In accordance with a second MAC address based load balancing embodiment, the load balancing unit is responsive to the corresponding source and destination address values of the packet, and is operative to select the destination port as a function of the source and destination address values.

An important advantage of a switch according to the present invention is that it provides a method and apparatus for balancing the loading of aggregated network links of a trunk connected to the switch, thereby increasing the data transmission rate through the trunk.

The foregoing and other objects, features, and advantages of the present invention will be apparent from the following detailed description of the preferred embodiment which makes reference to the several figures of the drawing.

IN THE DRAWING

Figure 3A:
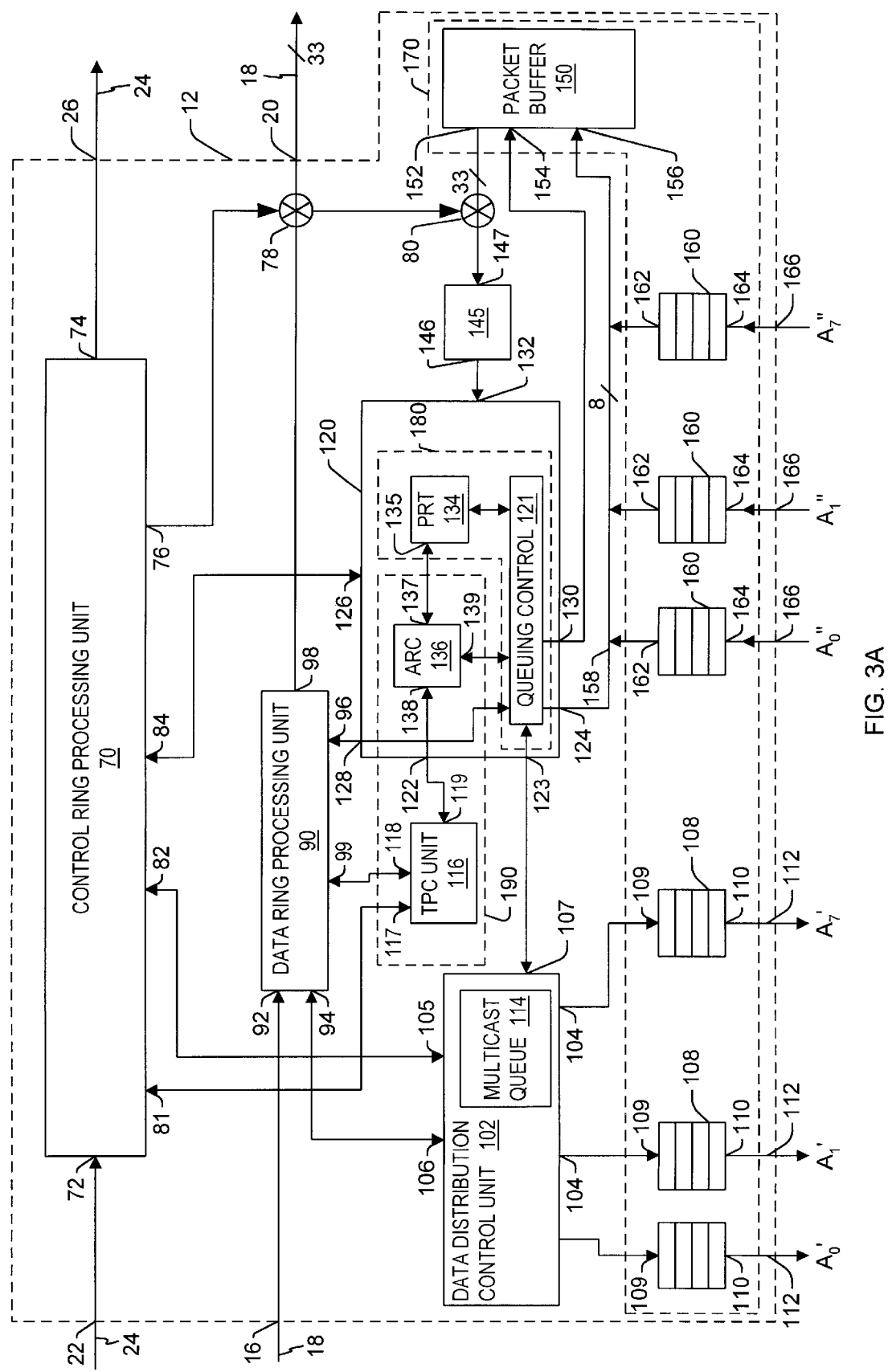
FIG. 3A is a detailed schematic circuit block diagram of a switching device of the packet switch of FIG. 2, the switching device including an address resolution circuit, a packet routing table, and a trunk port configuration unit in accordance with the present invention.
Figure 3B:
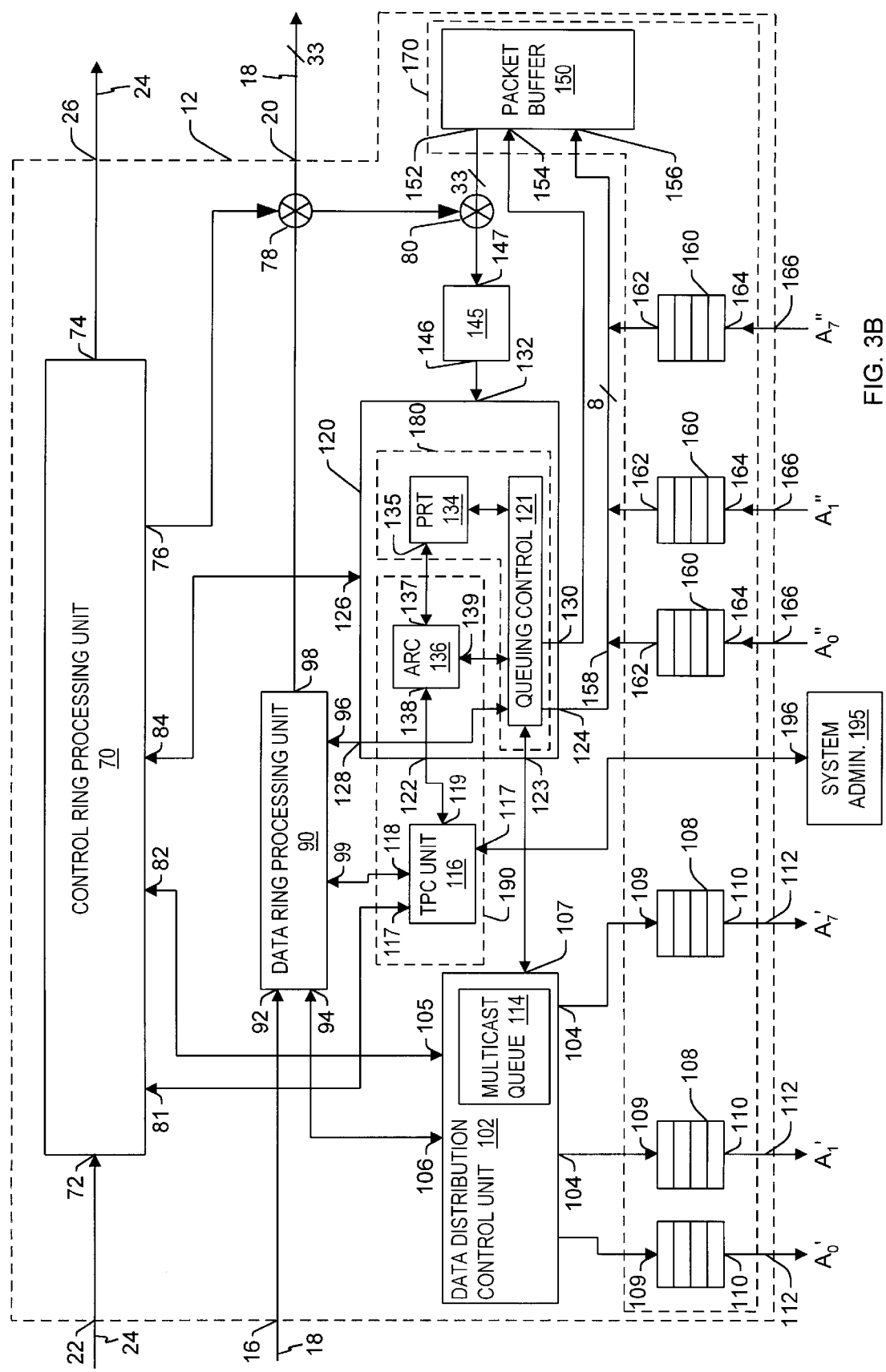
FIG. 3B is a detailed schematic circuit block diagram of an alternative embodiment of the switching device of FIG. 3A wherein the device is responsive to a local system administrator.
Figure 4A:
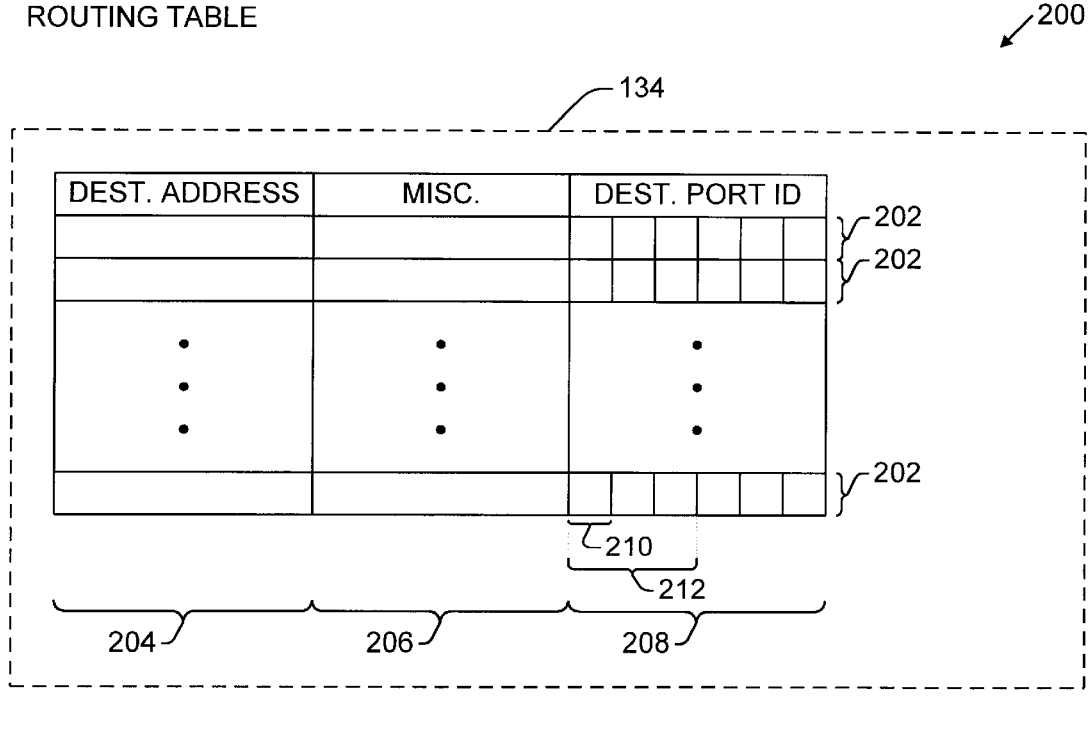
FIG. 4A is a generalized block diagram illustrating the structure and contents of the packet routing table of FIGS. 3A and 3B, the table being addressable via destination addresses of received packets and providing destination port ID values associated with the received packets.
Figure 4B:
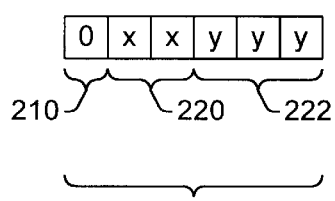
Figure 4C:
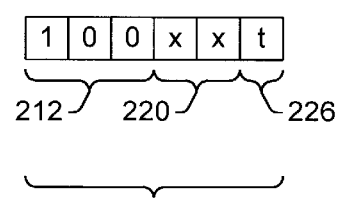
Figure 5:
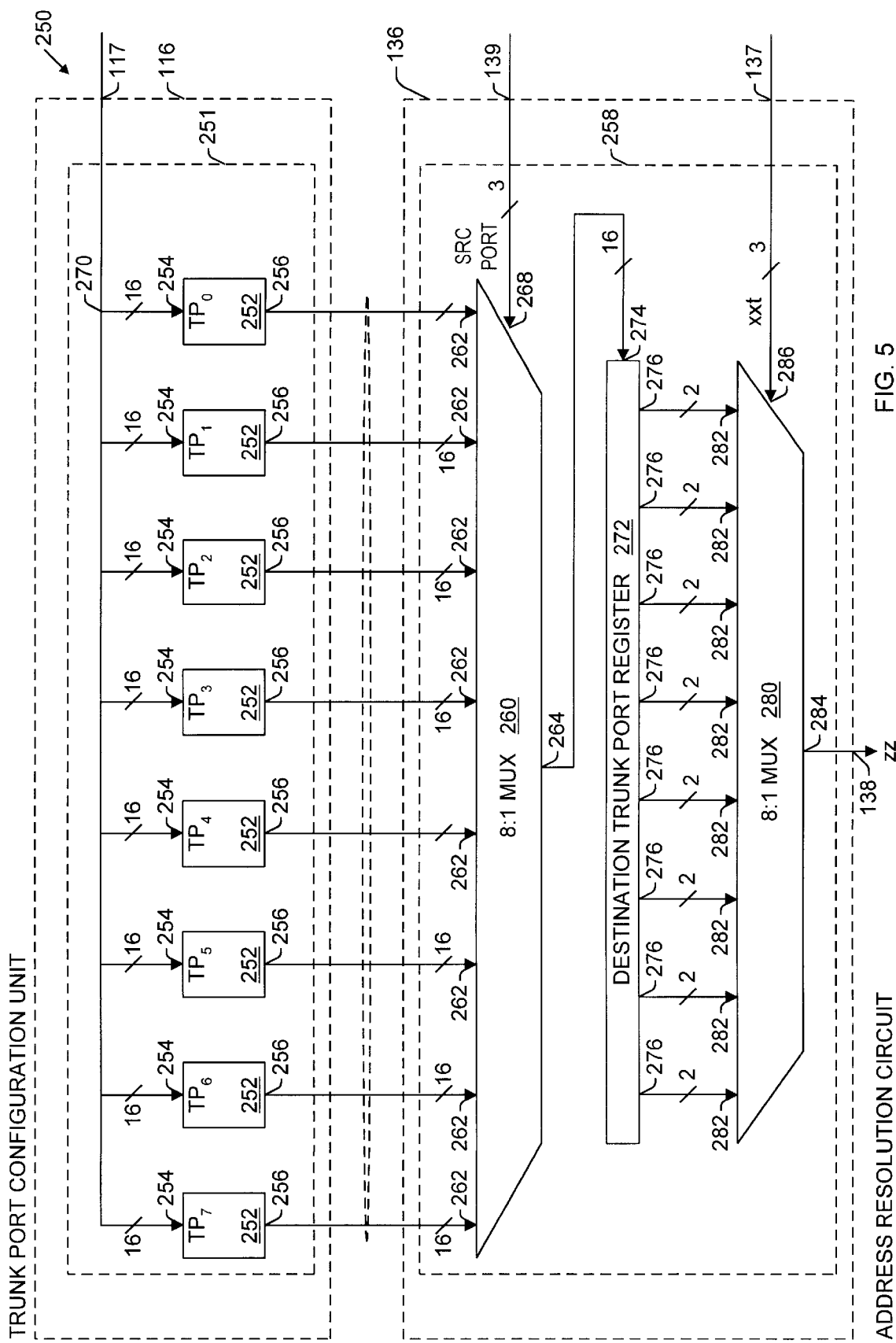
Figure 6:
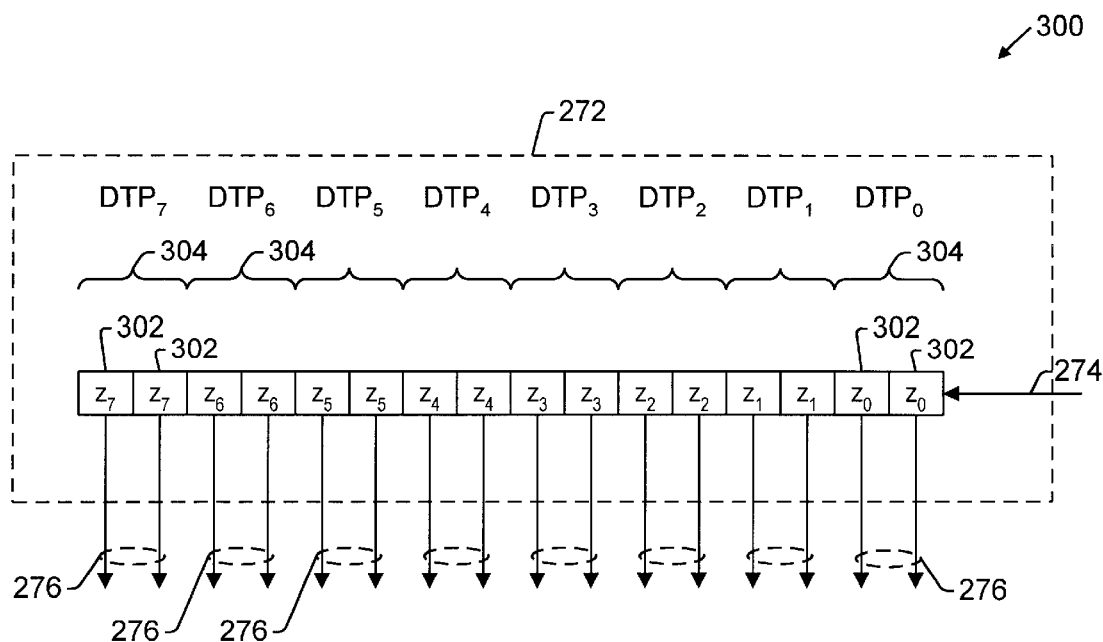
Figure 7:
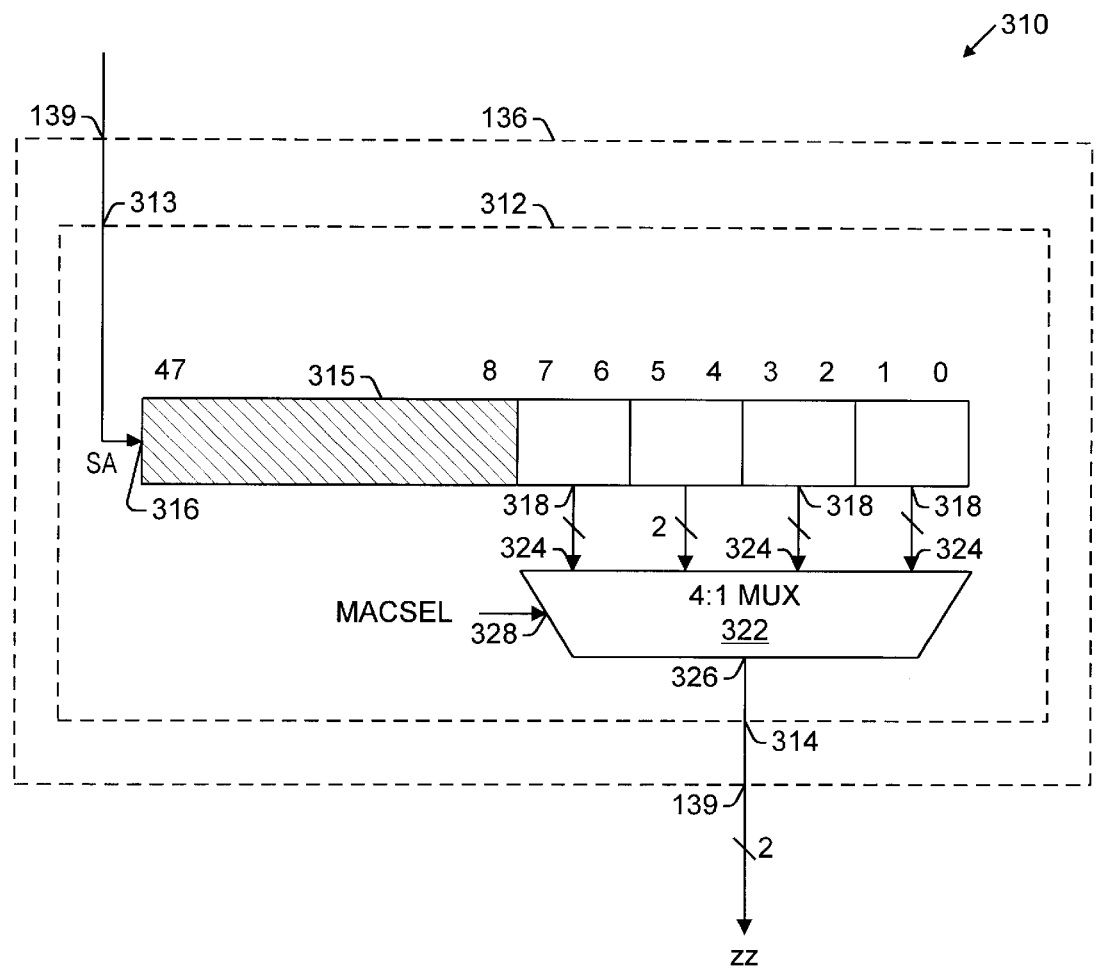

FIG. 4B is a block diagram illustrating the format of a regular non-trunking destination port ID value, FIG. 4C is a block diagram illustrating the format of trunked destination port ID value, FIG. 5 is a detailed block diagram illustrating details of the trunk port configuration unit and address resolution circuit of one of the switching devices in accordance with a port based trunked link load balancing scheme of the present invention;

FIG. 6 is a detailed block diagram of a destination trunk port register of the trunk port configuration unit of FIG. 5;

FIG. 7 is a block diagram of one embodiment of the address resolution circuit of FIGS. 3A and 3B in accordance with a first MAC address based trunked link load balancing scheme in accordance with the present invention; and FIG. 8 is a block diagram of an embodiment of the address resolution circuit of FIGS. 3A and 3B in accordance with a second MAC address based trunked link load balancing scheme in accordance with the present invention.

DETAILED DESCRIPTION OF THE PREFERRED EMBODIMENTS

The present invention overcomes the problems associated with the prior art by providing a method and apparatus for load balancing in trunking and link aggregation. In the following description, numerous specific details are set forth (e.g., a specific format for a trunked port ID value in a packet switch having a predefined number of ports) in order to provide a thorough understanding of the invention. Those skilled in the art will recognize, however, that the invention may be practiced apart from these specific details. In other instances, well known details of circuits (e.g., ETHERNET protocol) have been omitted, so as not to unnecessarily obscure the present invention.

Figure 1:
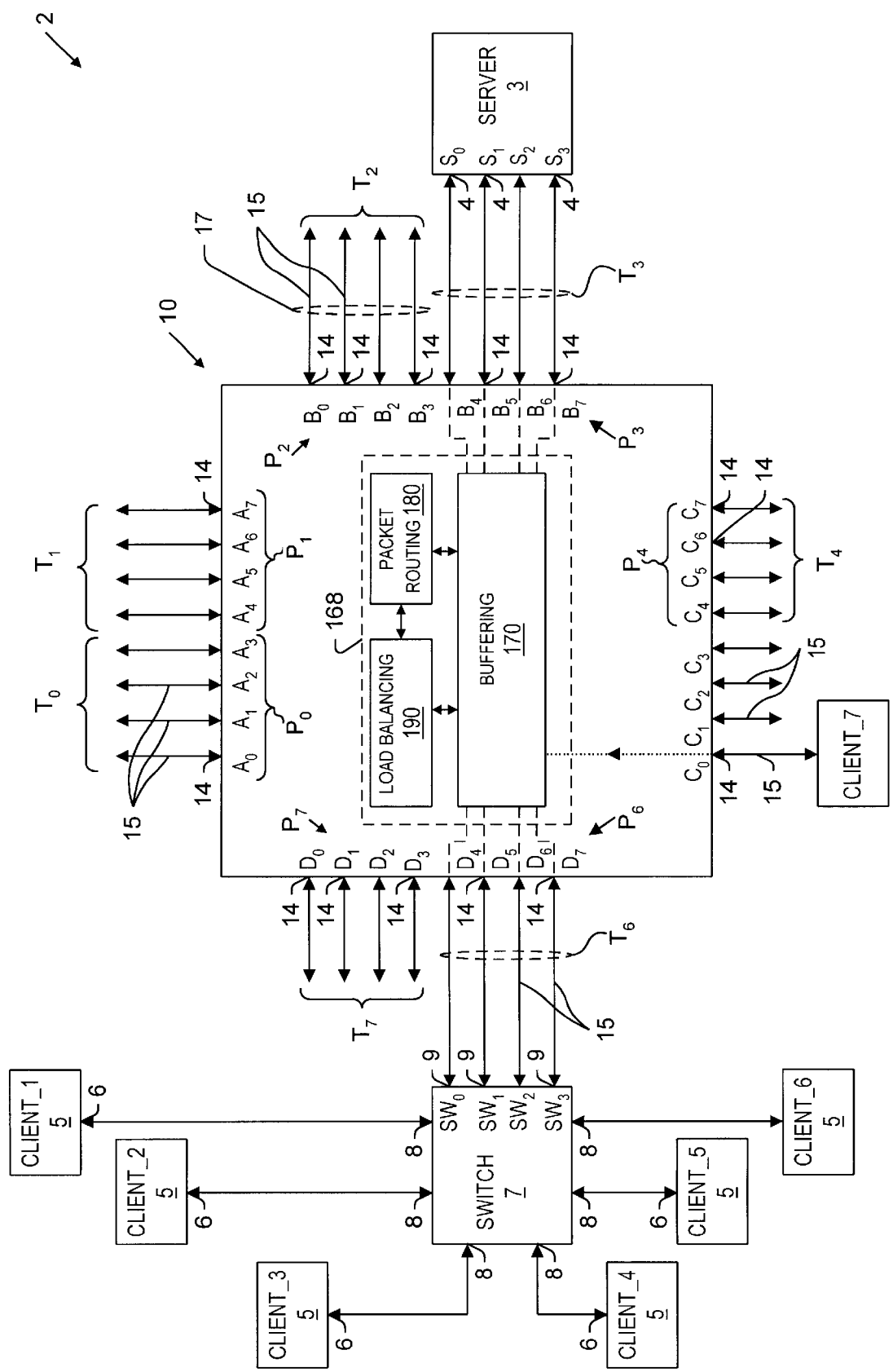
FIG. 1 is a schematic block diagram of an exemplary network system having a packet switch providing load balancing for a trunked link coupled between the switch and other network devices in accordance with the present invention.

FIG. 1 shows a schematic block diagram at 2 of an exemplary local area network system employing methods and apparatus for load balancing in trunking and link aggregation in accordance with the present invention. The network system 2 includes: a high speed server 3 having a plurality of network ports 4 for transmitting and receiving data packets via corresponding network links; a plurality of clients 5 each having at least one network port 6 for transmitting and receiving data packets to and from device including the server 3 via corresponding network data streams; a packet switch 7 having a plurality of client network ports 8 for transmitting and receiving data packets to and from corresponding ones of the clients 5 via corresponding network links, and a plurality of network ports 9; and a packet switch 10 providing load balancing for trunked, or aggregated, links in accordance with the present invention as further explained below.

In the depicted embodiment, the local area network system 2 includes six of the clients 5 designated CLIENT_1, CLIENT_2, CLIENT_3, CLIENT_4, CLIENT_6, and CLIENT_6. Each of the clients 5 may be a computer work station, any type of peripheral device connected with the switch 7 via an ETHERNET link (e.g., a printer), or any other type of network node.

The packet switch 10 includes four sets of eight network ports 14 designated $(A_0, A_1, \ldots, A_7)$, $(B_0, B_1, \ldots, B_7)$, $(C_0, C_1, \ldots, C_7)$ and $(D_0, D_1, \ldots, D_7)$ respectively for transmitting and receiving data packets via corresponding network links 15. In one embodiment of the present invention, the local area network 2 operates in accordance with ETHERNET, and each of the network links 15 is an ETHERNET link which transmits and receives packets of information in accordance with ETHERNET protocol.

The packet switch 10 includes means for link aggregation and trunking wherein a plurality of trunked links 17 are formed by aggregating sets of four of the network links 15 as further explained below. In one embodiment, the packet switch 10 may include a maximum of eight trunked ports designated $P_0$, $P_1$, $P_2$, $P_3$, $P_4$, $P_5$, $P_6$, and $P_7$, formed by aggregating ports $A_0$–$A_3$, ports $A_4$–$A_7$, ports $B_0$–$B_3$, ports $B_4$–$B_7$, ports $C_0$–$C_3$, and ports $C_4$–$C_7$, ports $D_0$–$D_3$, and ports $D_4$–$D_7$ respectively. In the depicted embodiment, the packet switch 10 includes seven trunked ports designated $P_0$, $P_1$, $P_2$, $P_3$, $P_4$, $P_5$, and $P_7$ wherein ports $C_0$–$C_3$ are not trunked. Port $C_0$ is shown to be coupled to a CLIENT_7 via one of the regular non-trunking network links 15. The eight trunked ports $P_0$, $P_1$, $P_2$, $P_3$, $P_4$, $P_5$, and $P_7$ are respectively coupled to eight trunked links designated $T_0$, $T_1$, $T_2$, $T_3$, $T_4$, $T_5$, and $T_7$. In varying embodiments of the present invention, switch 10 may include any integer number of ports 14, and trunked ports and trunked links may be formed by aggregating any integer number of ports 14 and links 15.

In one embodiment, each of the network links 15 has a bandwidth of 100 Megabits per second (100 Mbps), and each of the trunked links 17 provides a bandwidth 400 Mbps. Switch 7 may be implemented by any type of switch having trunking capability. The high speed server 3 includes a network interface card (not shown) providing for trunked link communication via the trunked link $T_3$.

Each of the server 3, and clients 5 has media access control information (MAC information) associated therewith including a destination MAC address and a source MAC address of the ETHERNET network. Each of the information packets communicated in the communications network include a destination address and a source address.

Each of the plurality of clients 5 communicates with the server 3 via the network links and the switches 7 and 10. Because traffic is heavy between the server 3 and the plurality of clients 5, it is desirable to provide a communication link having a maximized bandwidth between the clients 5 and server 3. In the depicted embodiment, the ports $B_4$–$B_7$ of switch 10 are respectively connected to the ports 4 designated $S_0$–$S_3$ of the server 3 via the trunked link $T_3$, and the ports $D_4$–$D_7$ of switch 10 are respectively connected to the ports 9 designated $SW_0$–$SW_3$ of the switch 7 via the trunked link $T_6$. Data streams are provided between the server 3 and the plurality of clients 5 via the trunked link $T_3$, switch 10, trunked link $T_6$, and switch 7.

Upon receiving a packet from a source device (e.g., the server 3 or one of the clients) at a source port, the switch 10 must provide for: determining a destination port associated with the received packet; and if the destination port is one of the trunked ports P of the switch, the switch 10 must also provide for selecting a particular destination port 14 from the plurality of ports 14 of the destination trunked port P.

In accordance with the present invention, the switch 10 includes a load balanced trunked link port mapping system 168 which is depicted generally in FIG. 1 and which is further explained below. The system 168 generally includes: a packet buffer 170 coupled to receive packets from network nodes via the ports 14 and the trunking ports P; a packet routing unit 180 coupled with the buffer 170 for receiving packet header information including a source MAC address and a destination MAC address of each packet received by the switch, and for determining a destination port ID value associated with each received packet wherein the destination port ID value indicates a corresponding one of either the regular non-trunking ports 14 or one of the trunking ports P; and a load balancing unit 190 coupled with the packet buffer 170 and routing unit 180 and providing for selecting a one of the ports 14 of a destination trunking port P if the destination port ID value indicates one of the trunking ports for a received packet.

For example, consider that a first packet is received from CLIENT_7 at port $C_0$, and the destination address of the first packet indicates the high speed server 3. The packet routing unit 180 generates a destination port ID value indicating trunked port $P_3$ as the destination port associated with the first packet. The load balancing unit 190 then selects a destination port from ports $B_4$–$B_7$ of the trunked destination port $P_3$. As another example, consider that a second packet is received from CLIENT_5 at port $D_0$, and the destination address of the second packet indicates the high speed server 3. The packet routing unit 180 generates a destination port ID value indicating trunked port $P_3$ as the destination port associated with the second packet. The load balancing unit 190 then selects a destination port from ports $B_4$–$B_7$ of the trunked destination port $P_3$. As a further example, consider that a third packet is received from the high speed server at port $B_4$, and the destination address of the third packet indicates CLIENT_1. In this case, the packet routing unit 180 generates a destination port ID value indicating trunked port $P_6$ as the destination trunked port associated with the third packet, and the load balancing unit 190 selects a destination port from ports $D_4$–$D_7$ of the trunked destination port $P_6$.

In accordance with the present invention, the load balancing unit 190 implements a trunked link load balancing scheme. The loading of each of the network links 15 of each of the trunked links 17 is proportional to the number of packets transmitted to the particular link, and is determined in accordance with the type of load balancing scheme implemented by the load balancing unit 190. In ETHERNET, it is required that the ordering of packets communicated between a particular source and its associated destination be maintained. For a given source-destination data stream providing communication between a source and its associated destination, the ordering of transmitted packets is maintained if the source-destination data stream is implemented over a non-varying physical data path. Therefore, it is not practical to implement a mapping scheme in the switch 10 between ports of a receiving trunked port and ports of a transmitting trunked port wherein packets received via the receiving trunked port are provided to and transmitted from the first available port of the receiving trunked port.

In accordance with a port-based load balancing scheme, further described below, a destination port selected for a particular packet received at a particular source port is determined in accordance with a port-based static programmed mapping scheme. As an example, packets received at source ports $B_4$–$B_7$ may be programmed to be provided to and transmitted from corresponding destination ports $D_4$–$D_7$ respectively. As another example, packets received at source ports $B_5$, $B_6$, $B_7$, and $B_4$ may be programmed to be provided to and transmitted from corresponding destination ports $D_6$, $D_4$, $D_5$, and $D_7$ respectively. In the port based load balancing scheme, the destination port for a particular packet (selected from the plurality of ports of a corresponding destination trunked link) is determined based on the source port at which the packet has been received.

In accordance with a first MAC address table based load balancing scheme, further described below, the load balancing unit 190 implements a dynamic trunked port mapping scheme wherein the destination port for a particular packet (selected from the plurality of ports of its corresponding destination trunked link) is determined based on the source address of the packet.

In accordance with a second MAC address table based load balancing scheme, further described below, the load balancing unit 190 implements a dynamic trunked port mapping scheme wherein the destination port for a particular packet (selected from the plurality of ports of the destination trunked link associated with the particular packet) is determined based on the MAC source address and the MAC destination address of the packet.

Figure 2:
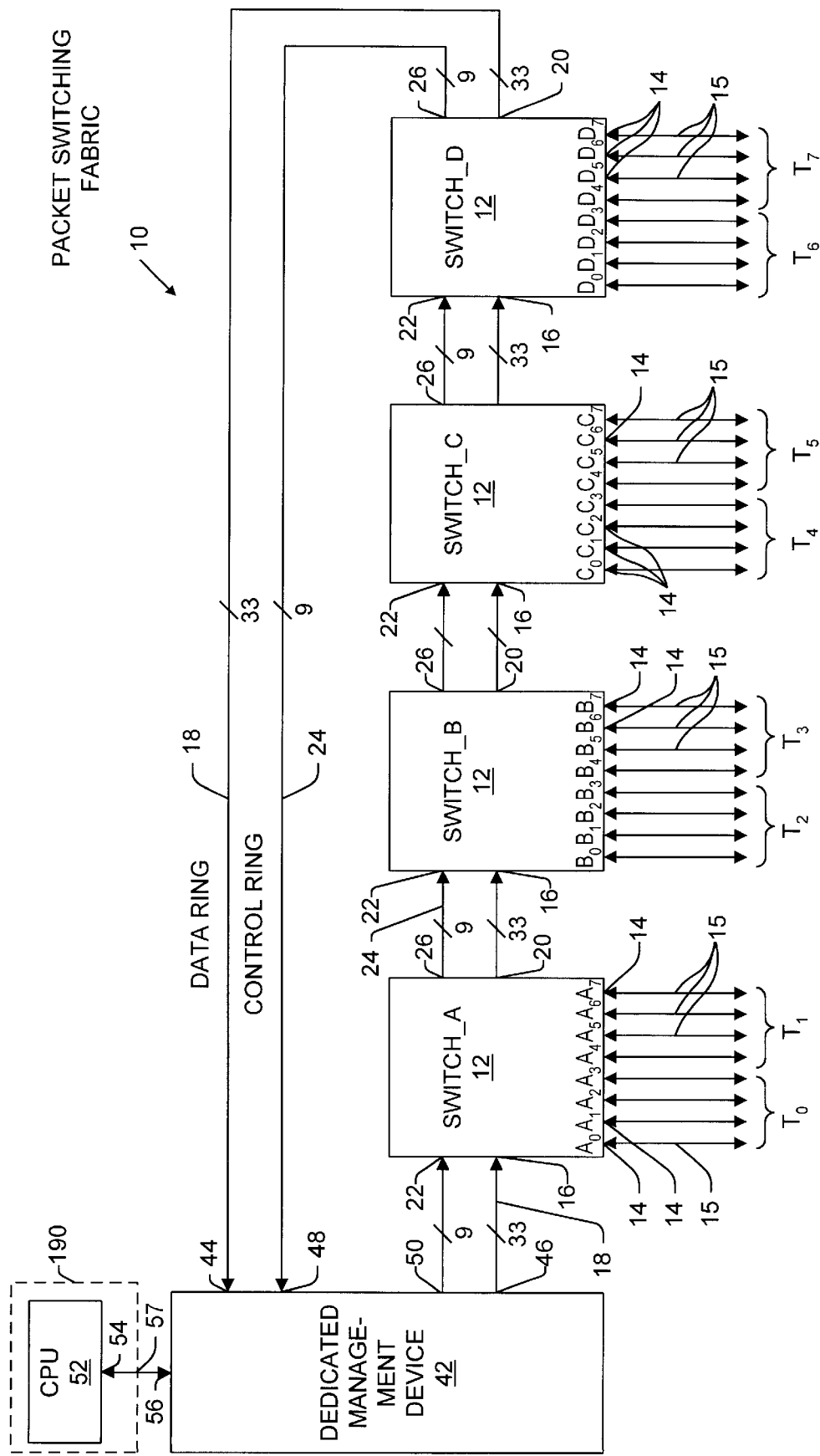
FIG. 2 is a schematic block diagram of one embodiment of the packet switch of FIG. 1, the switch including a system administration unit, and a plurality of switching devices each providing load balancing functions in accordance with the present invention.

FIG. 2 shows a schematic block diagram at 10 of one embodiment of the packet switch 10 (FIG. 1) implemented as a packet switching fabric including means for load balancing for link aggregation and trunking (not shown) according to the present invention as further explained below. Although the load balanced trunked link port mapping system 168 (FIG. 1) is shown as implemented in a packet switching fabric having a ring topology, it will be apparent to those skilled in the art that the load balanced trunked link port mapping methods of the present invention may be implemented in a packet switch having any type of topology including a bus, a token ring, and a cross bar switch. Therefore, the trunked link load balancing methods and apparatus of the present invention should not be construed as limited to use in a packet switching fabric having a ring topology.

The switching fabric 10 includes four switching devices 12, designated SWITCH_A, SWITCH_B, SWITCH_C, and SWITCH_D, having the network ports 14 designated ($A_0, A_1, \ldots, A_7$), ($B_0, B_1, \ldots, B_7$), ($C_0, C_1, \ldots, C_7$) and ($D_0, D_1, \ldots, D_7$) respectively for transmitting and receiving data packets via the corresponding ETHERNET links 15; a data ring input port 16 connected to receive data and data ring messages from an upstream device via a corresponding one of a plurality of 33-bit data ring segments 18; a data ring output port 20 connected to transmit data and data ring messages to a corresponding downstream device via a corresponding one of the data ring segments 18; a control ring input port 22 connected to receive control ring messages which include resource reservation protocol messages from the corresponding upstream device via a corresponding one of a plurality of control ring segments 24; and a control ring output port 26 connected to transmit control ring messages to the corresponding downstream device via a corresponding one of the control ring segments 24.

The switching fabric includes means for link aggregation and trunking wherein each of the switching devices 12 includes two selectable trunked ports each formed by aggregating four of the network ports 14 as further explained below. SWITCH_A includes two selectable trunked ports designated $P_0$ and $P_1$ which are formed by aggregating ports $A_0$–$A_3$, and ports $A_4$–$A_7$ respectively. SWITCH_B includes two selectable trunked ports designated $P_2$ and $P_3$ which are formed by aggregating ports $B_0$–$B_3$, and ports $B_4$–$B_7$ respectively. SWITCH_C includes two selectable trunked ports designated $P_4$ and $P_5$ which are formed by aggregating ports $C_0$–$C_3$, and ports $C_4$–$C_7$ respectively. SWITCH_D includes two selectable trunked ports designated $P_6$ and $P_7$ which are formed by aggregating ports $D_0$–$D_3$, and ports $D_4$–$D_7$ respectively. Trunked ports $P_0$–$P_7$ are coupled to trunked links $T_0$–$T_7$ respectively.

The packet switching fabric 10 also includes: a dedicated ring management device 42 having a data ring input port 44 connected to receive data and data ring messages from the corresponding upstream device, SWITCH_D, via a corresponding one of the data ring segments 18, a data ring output port 46 connected to transmit data and data ring messages to the corresponding downstream device, SWITCH_A, via a corresponding one of the data ring segments, a control ring input port 48 connected to receive control ring messages from the upstream device via a corresponding one of the control ring segments 24, and a control ring output port 46 for transmitting control ring messages to the downstream device via a corresponding one of the control ring segments; and a central processing unit (CPU) 52 having a port 54 connected to a port 56 of the management device 42 via a CPU link 57.

The CPU 52, which is included within the load balancing unit 190 (FIG. 1), executes system administration software, and provides for port mapping in accordance with the port based load balancing embodiment. As further explained below, each of the switching devices 12 includes apparatus for configuring the trunk ports $T_0$–$T_7$ of the packet switch 10. The system administrator provides trunk port configuration signals to each of the switching devices 12 via the control ring 24 for the purpose of configuring the trunk ports $T_0$–$T_7$ of the packet switch 10.

FIG. 3A shows a detailed schematic circuit block diagram of components of one of the switching devices 12 of the packet switching fabric of 10 (FIG. 2). Each of the switching devices includes a data ring processing sub-system, a network interface sub-system, and a control ring sub-system. The control ring sub-system of the switching device 12 includes a control ring processing unit 70 having: an input port 72 connected to receive control ring messages including resource reservation protocol messages via control ring input port 22; an output port 74 connected to provide the control ring messages to the control ring via the control ring output port 26; a bandwidth control port 76 connected to provide channel bandwidth resource control signals to a data ring channel bandwidth resource means 78, and a packet buffer channel bandwidth resource means 80 further explained below; and ports 81, 82, and 84 further explained below.

The data ring processing sub-system of the switching device 12 includes a data ring processing unit 90 having: an input 92 connected to receive packet data bursts from a corresponding upstream switching device 12 (FIG. 2) via a corresponding data segment 18 and the data ring input port 16; a data port 94 further explained below; a port 96 further explained below; an output 98 connected to the data ring output port 20 via the data ring channel bandwidth resource means 78, and a port 99 further explained below.

The depicted switching device 12 further includes: a data distribution control unit 102 having eight outputs 104, a port 105 coupled for communication with port 82 of the control ring processing unit 70, a port 106 connected to receive packet data bursts from output 94 of the data ring processing unit 90, and a port 107 further explained below; and eight transmit buffer queues 108 each having an input 109 connected to receive data from a corresponding one of the eight outputs 104 of unit 102, and an output 110 connected to a corresponding one of eight network output ports 112 designated ($A_0'$, $A_1'$, ..., $A_7'$). The data distribution control unit 102 also includes a multicast queue 114 having an input 115 connected to port 107 of the control unit 102 as further explained below.

The data distribution control unit 102 further includes a network output port arbitration sub-system (not shown) for communicating with local and non-local requesting agents competing for access to the eight network output ports for the purpose of transmitting data packets to the network. Details of the arbitration sub-system are described in Applicants' pending U.S. patent application Ser. No. 09/241,658 which claims priority to Applicants' U.S. Provisional Patent Application Ser. No. 60/073,861 filed Feb. 3, 1998, entitled "Bit Slice Arbiter" which is incorporated herein by reference in its entirety.

The control ring processing sub-system of the depicted switching device 12 further includes: a trunk port configuration unit (TPC unit) 116 having a port 117 coupled for communication with port 81 of the control ring processing unit 70, a port 118 coupled for communication with port 99 of the data ring processing unit 90, and a port 119; and an input queuing control unit 120 having a queuing control logic unit 121.

The input queuing control unit 120 includes: a port 122 coupled to port 119 of the trunk port configuration unit 116; a port 123 coupled to port 107 of the data distribution control unit 102; a bus port 124; a control port 126 connected to receive queuing enable signals from port 84 of the control ring processing unit 70; a port 128 connected to port 96 of the data ring processing unit 90; a packet buffer memory control port 130; and a data port 132.

The input queuing control unit 120 further includes: a packet routing table (PRT) 134 providing packet routing information as further described below, and having a port 135; and an address resolution circuit 136 having a port 137 coupled for communication with port 135 of the packet routing table (PRT) 134, and a port 138 coupled for communication with port 118 of the trunk port configuration unit 116. In one embodiment, the trunk port configuration unit 116, and address resolution circuit 136 implement the load balancing unit 190 (FIG. 1) and provide trunked link load balancing functions in accordance with the present invention as further explained below. Also, in one embodiment, the queuing control logic unit 121 and packet routing table 134 implement the packet routing unit 180 (FIG. 1).

A network interface sub-system of the depicted switching device 12 includes an internal first in-first out buffer (FIFO) 145 having an output 146 connected to provide data to input 134 of the control unit 120, and an input 147; an external packet buffer 150 having a data output 152 connected to input 147 of FIFO 145 via the packet buffer channel bandwidth resource means 80 which is responsive to the channel bandwidth resource control signals provided by the control ring processing unit 70 to control the bandwidth resources of the 32 bit wide communication path between output 152 of packet buffer 150 and input 147 of the FIFO 145, a control port 154 connected to receive queuing control signals from the packet buffer memory control port 132 of the control unit 120 and also providing data address pointer information to control port 130 of the input queuing control unit, and an input 156 connected to a bus 158 which is connected to bus port 124 of the control unit 120; and eight receive buffer queues 160 each having an output 162 connected to provide data to the bus 158, and an input 164 connected to receive data from a corresponding one of eight network input ports 166 designated ($A_0", A_1", \ldots, A_7"$). The eight network input ports 166, and corresponding eight network output ports 112 designated ($A_0', A_1', \ldots, A_7'$) are implemented by the eight network bi-directional ports 14 designated ($A_0, A_1, \ldots, A_7$) (FIG. 2). In one embodiment, each of the buffer queues 108 and 160, and the packet buffer 160 implement the packet buffering unit 170 (FIG. 1).

An ETHERNET frame, or packet of data, includes header information specifying a source address of a source end node, and a destination address of a destination end node. When a data packet is received via one of the network input ports 166, the data packet is initially buffered by the corresponding receive buffer queue 160. The control unit 120, which is connected to bus 158 via port 124, receives header information of the packet including its media access control information (MAC information) including a destination MAC address and a source MAC address of the ETHERNET. Concurrently, the packet is transmitted to and stored in buffer 150. Upon storing the data packet, buffer 150 provides pointer addresses to port 132 of the control unit 120 which includes queuing structure storage registers for storing pointer addresses corresponding to each received data packet.

After the arbitration sub-system (not shown) grants access to the packet routing table 134 for a data packet, the address resolution circuit 136 reads the destination address included in the header information of the data packet received via the network ports to determine a destination port of the packet via the packet routing table 134 which provides ID codes of the destination device and output port which is communicatively coupled to the destination end node specified by the destination address. The packet routing table 134 indicates to which network output port 112 of which device 12 a particular packet must be forwarded to reach the end node indicated by the destination address specified by the packets header. The address resolution circuit 136 reads the header information of the data packet including the source address and destination address, and performs a packet destination look up operation using the destination address.

When a match is found in the packet routing table 134 for a destination address specified by packet header information, it is then determined whether the destination address is connected to a network port of the receiving device, or to a network port of another device of the switching fabric 10 (FIG. 2). If the destination port is a local network port 14 (FIG. 2) of the current receiving device, only a local transaction must be processed. If the destination port is a network port 14 (FIG. 2) of a device of the fabric other than the current receiving device, the data packet must be transferred from the current receiving device, or "source device", to the destination device via the data ring by processing an interconnect transaction which requires resource reservation performed using a resource reservation protocol.

The resource reservation protocol is used to set up source-destination channels for each interconnect transaction prior to beginning the transfer of data from a source device to a destination device via a source-destination channel on the data ring. The resource reservation protocol uses protocol control messages including a source request message (SRC_REQ message), a get resource message (GET_RES message), and a destination grant message (DST_GRANT message).

To initiate an interconnect transaction, the control ring processing unit 70 of a source device develops a SRC_REQ message including a field carrying the destination port ID code associated with the destination port, determined by and received from the control unit 120. The control ring processing unit 70 transmits the SRC_REQ message to the destination device via the control ring. When a destination device receives a SRC_REQ message from a source device via the control ring, the SRC_REQ message is temporarily buffered. The control ring processing unit 70 reads the SRC_REQ messages and provides corresponding request signals to the network output port arbitration sub-system 116. Based on the source port and destination port indicated by the SRC_REQ message, the processing unit 70 provides a signal to the arbitration sub-system 116 requesting access to the destination port on behalf of the source port as the requesting agent.

The control unit 120 is operative to access data packets a data burst at a time from the external packet buffer 150 in response to the queuing enable signal received at port 126 from the control ring processing unit 70. Data packets are read out a burst at a time from the external packet buffer 150 via multiple channels under control of the control unit 120. When the control ring processing unit 70 allocates sufficient external packet buffer channel bandwidth, the packet buffer begins transmitting packet data bursts from output 178 of the buffer 150 to input 147 of the internal FIFO 145 under control of the input queuing control unit 120.

For local transactions for which the destination port is a local interconnect output port: if the source selected by the arbitration process is the local multicast queue 110 of the data distribution control unit 102, the packet at the head of the multicast queue is transferred to the appropriate one of the transmit buffer queues 106 for transmission via the corresponding network output port 108; and if the source selected by the arbitration process is one of the local receive buffer queues 160, the control ring processing unit 70 sets up a channel to communicatively couple the external packet buffer 150 to the appropriate one of the transmit buffer queues 108 when the requested packet buffer channel bandwidth is available. In a local interconnect transaction for which the destination port is the local multicast queue 112, if the source selected is a local receive queue 160, the control ring processing unit 70 sets up a channel to communicatively couple the external packet buffer 150 to the multicast queue 110 when the requested packet buffer channel bandwidth is available.

Additional details of the packet switching fabric 10 are described in Applicants' pending U.S. patent application Ser. No. 09/092,350, filed Jun. 5, 1998, entitled "Packet Switching Fabric Using A Segmented Ring With Resource Reservation Protocol", which is incorporated herein by reference in its entirety. U.S. patent application Ser. No. 09/092,350 claims the benefit of Applicants' earlier filed U.S. Provisional Application Ser. No. 60/073,535, filed Feb. 3, 1998, entitled "Packet Switching Fabric Using the Segmented Ring With Resource Reservation Control."

FIG. 3B shows a detailed schematic circuit block diagram of an alternative embodiment of one of the switching devices 12 of the packet switching fabric of 10 (FIG. 2). In this embodiment, the packet switching fabric (FIG. 2) does not include the dedicated system management device 42 and CPU 52 (FIG. 2), and the system administration functions, mentioned above and further described below, are implemented by a local system administration unit 180 which is connected to communicate with the trunk port configuration unit 116 via its port 117. In varying embodiments, the local system administration unit 180 may be implemented by an EEPROM or by a processing unit.

FIG. 4A shows a generalized block diagram illustrating at 200 the structure and contents of the packet routing table 134 (FIGS. 3A and 3B) of a particular one of the switching devices 12 of the packet switching fabric 10 (FIG. 2). In the depicted embodiment, the packet routing table 134 includes a plurality of entries 202, each entry including: a MAC destination address field 204 for storing the MAC destination address of a corresponding one of the packets received by the particular switching device; miscellaneous fields 206 for storing additional packet routing information; and a destination port ID field 208 for storing a destination port ID value indicating a destination port of the switching fabric 10 (FIG. 2) for the corresponding received packet. The destination port ID value may indicate one of the trunked ports $P_0$–$P_7$ (FIG. 1) of the switch 10 (FIG. 1), or a regular non-trunking network port 14 (FIG. 1) as determined by a destination port ID value coding scheme as further explained below.

The packet routing table 134 is accessed by logic (not shown) of the address resolution circuit 136 (FIG. 3A) of the input queuing control unit 120 (FIG. 3A). Upon receiving a particular packet from one of the eight receive buffer queues 160 (FIGS. 3A and 3B) of the particular switching device 12, the address resolution circuit 136 provides the destination MAC address value of the particular packet to the packet routing table 134 to determine a target entry 202 storing a destination address value matching the destination MAC address value of the particular packet. The address resolution circuit then reads the destination port ID value from the destination port field 208 associated with the target entry 202 to determine a destination port corresponding with the particular packet. As mentioned above, the destination port is communicatively coupled with a destination node specified by the MAC destination address indicated by the particular packet.

In the depicted embodiment, the destination port ID field 208 of each entry 202 stores a 6 bit destination port ID value indicating the destination port for a corresponding packet. In one embodiment of a destination port ID value coding scheme in accordance with the present invention, if a first bit field 210 of the destination port ID field 208 stores a value of zero, then it is assumed that the indicated destination port is a regular non-trunking network port 14 (FIG. 1) of the switch 10. Alternatively, if a trunk port subfield 212 including the first three bits of the destination port ID field 208 stores the value '100', then it is assumed that the indicated destination port is one of the trunked ports $P_0$–$P_7$, (FIG. 1) of the switch. destination port is one of the trunked ports $P_0$–$P_7$ (FIG. 1) of the switch.

FIG. 4B shows a block diagram illustrating a format at 216 of a regular non-trunking destination port ID value including: the first bit 210 having the value '0' stored therein to indicate that the destination port is a regular non-trunking network port 14 (FIG. 1); a device ID field 220 for storing an N-bit destination device ID value uniquely identifying a corresponding destination one of the plurality of switching devices 12 (FIG. 2) wherein N is the minimum number of bits required to uniquely identify each of $2^N$ switching devices; and a port ID field 222 for storing an M-bit destination port ID value for uniquely identifying a corresponding destination one of a plurality of M network ports 14 (FIG. 2) of the destination device, wherein M is the minimum number of bits required to uniquely identify each of $2^M$ network ports of the destination switching device. In the example of the switching fabric 10 (FIG. 2) which includes four switching devices 12 each having network ports 14 (N=2, and M=3), a regular non-trunking destination port may be uniquely identified by a two-bit destination device ID value (x,x) stored in device ID field 220, and a three-bit destination port ID value (y,y,y) stored in port ID field 222.

FIG. 4C shows a block diagram illustrating a format at 224 of a destination trunked port ID value including: the trunk port field 212 having the value '100' stored therein to indicate that the destination port is one of the trunked destination ports $P_0$–$P_7$ (FIG. 1); the device ID field 220 for storing the two-bit destination device ID value (x,x) uniquely identifying a corresponding destination one of the plurality of switching devices 12 (FIG. 2); and a trunk identification field 226 for storing a one-bit destination trunk ID value specifying one of the two trunked ports of the indicated destination device, the trunked ports being coupled to corresponding trunked links 17 (FIG. 1).

FIG. 5 shows a block diagram at 250 illustrating details of the trunk port configuration unit 116 (FIG. 3A) and the address resolution circuit 136 (FIG. 3A) of one the switching devices 12 in accordance with a first embodiment of the present invention wherein the switch 10 (FIG. 1) provides port based load balancing for each of the trunked links 17 (FIG. 1). In the depicted embodiment, the trunk port configuration unit 116 includes a register bank 251 having a plurality of 8 trunk port configuration registers 252, each being associated with a corresponding one of the network input ports 166 (FIGS. 3A and 3B) of the switching device 12 (FIGS. 3A and 3B). Each of the registers 252 include an input 254 coupled to receive a port mapping signal carrying a sixteen-bit port mapping value from the CPU 52 (FIG. 1) via port 117 of the TPC unit 116, and an output 256. In the alternative embodiment of the switching device 12 (FIG. 3B) of the packet switching fabric of 10 (FIG. 2), the inputs 254 of the trunk port configuration registers 252 are coupled to receive the port mapping signals carrying the sixteen bit port mapping values from the local system administration unit 180 (FIG. 3B) via port 117 of the TPC unit 116.

The address resolution circuit 136 comprises a port based load balancing circuit 258 including: a source port selection multiplexer 260 having a plurality of ($2^M$=8) inputs 262 each coupled to receive a corresponding one of the port mapping values from output 256 of a corresponding one of the configuration registers 252 of unit 116, an output 264, and a control port 268 coupled to receive a three-bit source port ID value carried by a source port signal received from the input queuing control logic unit 121 (FIG. 3A) of the particular switching device; a destination trunk port register 272 having an input 274 coupled to receive selected ones of the port mapping values from output 264 of multiplexer 260, and a plurality of ($2^M$=8) outputs 276; and a trunk port selection multiplexer 280 having a plurality of ($2^M$=8) inputs 282 each coupled to receive a two-bit value from a corresponding one of the outputs 276 of register 272, an output 284, and a control port 286 coupled to receive a trunked port ID signal carrying a three bit trunked port ID value (x,x,t) from the packet routing table 134 (FIGS. 3A and 3B) as further explained below.

In the depicted embodiment, the register bank 251 of unit 116 includes eight of the trunk port configuration registers 252, designated $TP_0$–$TP_7$, each being associated with a corresponding one of the eight network ports 14 of the particular switching device 12 (FIG. 3A). The source port selection multiplexer 260 selects from the outputs 256 of registers 252 in response to the source port value received at its control port 268 from the input queuing control logic 121 (FIG. 3A). The source port value indicates the source port at which a particular packet has been received. Therefore, the multiplexer 260 selects one of the registers 252 which corresponds with the source port associated with the received packet. As further described below, the 16-bit port mapping value stored in the selected one of the registers 252 includes eight separate 2-bit port values select each indicating a destination port associated with the particular packet received at the corresponding source port.

The destination trunk port register 272, further described below, stores the 16-bit port mapping value received from the selected one of the registers 252, and in response to the 3-bit trunk port ID value (x,x,t) received from the packet routing table, multiplexer 280 selects one of the 2-bit values of the 16-bit port mapping value.

FIG. 6 shows a detailed block diagram at 300 of the destination trunk port configuration register 272 of the port based load balancing circuit 258 (FIG. 5). The register 272 includes sixteen cells 302 each providing storage for one binary value. As mentioned above, input 274 of the register is couple to receive a selected one of the sixteen-bit port mapping values from output 264 of multiplexer 260, wherein the selected port mapping value for a received packet is determined based on the source port associated with the received packet. As further explained below, each of the sixteen-bit port mapping values includes eight two-bit port select values (z,z) for indicating one of the four network ports 14 of an associated one of the trunked ports $P_0$–$P_7$ of the switch 10 (FIG. 1).

The register 272 provides for storing eight two-bit port select fields 304 designated $DTP_0$–$D_7$, each field 304 corresponding with one of the trunked ports $P_0$–$P_7$ of the switch 10 (FIG. 1). Each field 304 provides for storing a two-bit port select value (z,z) for indicating one of the four network ports 14 of the corresponding one of the trunked ports $P_0$–$P_7$ associated with the particular port select field 304. For example, the port select field 304 designated $DTP_0$ stores a two-bit port select value ($z_0,z_0$) indicating a destination one of the four network ports $A_0$–$A_4$ of the trunked port $P_0$ of the switch 10 (FIG. 1). Therefore, the sixteen-bit port mapping values, which are provided by the system administrator, determine the particular destination port of the corresponding destination trunked port for each packet based on the source port associated with the packet. These port mapping values are programmed by a user. Therefore, the port based load balancing scheme is static in the sense that the port mapping may only be changed by reprogramming the port mapping values stored in the system administrator.

FIG. 7 shows a block diagram at 310 of one embodiment of the address resolution circuit 136 (FIGS. 3A and 3B) in accordance with a source MAC address based load balancing scheme for trunked links in accordance with the present invention. In the depicted embodiment, the address resolution circuit 136 includes a source MAC address code selection circuit 312 having a port 313 coupled to receive 48-bit source MAC address values from the input queuing control logic 121 (FIGS. 3A and 3B) via port 139 of the address resolution circuit 136, and an output 314 coupled to provide two-bit port select values (z,z) for indicating selected ones of the four network ports 14 of corresponding ones of the trunked ports $P_0$–$P_7$ of the switch 10 (FIG. 1). Each of the 48-bit source MAC address values is associated with a received packet, and the two-bit port select value (z,z) indicates a destination port (for the received packet) of the four network ports 14 of a destination one of the trunked ports $P_0$–$P_7$ of the switch 10 (FIG. 1).

The source MAC address code selection circuit 312 includes: a 48-bit register 315 having an input 316 coupled to receive the 48-bit source MAC address values from the input queuing control logic 121 (FIGS. 3A and 3B) via port 313, and a plurality of outputs 318 each providing a corresponding two-bit source address derived value (derived from the stored source address value) from a corresponding pair of cells of the register; and a multiplexer 322 having a plurality of inputs 324 coupled to receive corresponding ones of the two-bit source address derived values from corresponding ones of the outputs 318 of register 315, an output 326, and a control port 328 coupled to receive a two-bit (N=2) source address bit select signal from dedicated registers (not shown) of the trunk port configuration unit 116 (FIGS. 3A and 3B).

FIG. 8 shows a block diagram at 350 of an embodiment of the address resolution circuit of FIGS. 3A and 3B in accordance with a second MAC address based load balancing scheme for aggregated links in accordance with the present invention, wherein destination ports associated with a particular packet are selected from the trunked network ports coupled to a corresponding destination trunk port based on the source address and destination address of the particular packet.

In the depicted embodiment, the address resolution circuit 136 includes the source MAC address code selection circuit 312 (FIG. 7) having its port 313 coupled to receive the 48-bit source MAC address values from the input queuing control logic 121 (FIGS. 3A and 3B) via port 139 of the address resolution circuit 136, and its output 314 coupled to provide a two-bit port select value (z,z) for indicating one of the four network ports 14 of a corresponding one of the trunked ports $P_0$–$P_7$ of the switch 10 (FIG. 1).

In the depicted embodiment, the address resolution circuit 136 additionally includes a 48-bit destination address register 360 having an input 362 coupled to receive the 48-bit destination MAC address values from the input queuing control logic 121 (FIGS. 3A and 3B) via port 139 of the address resolution circuit 136, and a plurality of outputs 366 each providing a corresponding two-bit value from a corresponding pair of cells of the register 360; a multiplexer 370 having a plurality of inputs 372 coupled to receive corresponding ones of the two-bit values from corresponding ones of the outputs 366 of register 360, an output 374, and a control port 376 coupled to receive a two-bit destination address bit select signal from dedicated registers (not shown) of the trunk port configuration unit 116 (FIGS. 3A and 3B); and an exclusive-OR logic unit 380 having a first input 382 coupled to receive a two-bit destination address value $DA_{zz}$ from output 374 of multiplexer 370, and a second input 384 coupled to receive a two-bit source address value $SA_{zz}$ from output 314 of the source MAC address code selection circuit 312.

Table 1, below, provides a truth table illustrating the function of the exclusive-NOR logic unit 380.

TABLE 1

MAC-Address-Table Based Load Balancing Truth Table

| DAzz | SAzz | zz |
|------|------|----|
| 00 | 00 | 11 |
| 00 | 01 | 10 |
| 00 | 10 | 01 |
| 00 | 11 | 00 |
| 01 | 00 | 10 |
| 01 | 01 | 11 |
| 01 | 10 | 00 |
| 01 | 11 | 01 |
| 10 | 00 | 01 |
| 10 | 01 | 00 |
| 10 | 10 | 11 |
| 10 | 11 | 10 |
| 11 | 00 | 00 |
| 11 | 01 | 10 |
| 11 | 10 | 10 |
| 11 | 11 | 11 |

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A communications network switch including a plurality of network ports for transmitting and receiving packets to and from network nodes via network links, the switch being operative to communicate with at least one trunking network device via at least one trunk formed by a plurality of aggregated network links, the trunk being coupled with a corresponding trunked port including a subset of the network ports that are coupled with corresponding ones of the aggregated network links of the trunk, the switch comprising:

packet buffering means coupled with the network ports, said buffering means for temporarily storing a packet received at a source port, said packet having a source address value, and a destination address value indicating a destination node that is communicatively coupled with said switch via a data path including a trunk;

packet routing means coupled to communicate with said buffering means, said routing means for determining a destination trunked port associated with said packet, said destination trunked port including a subset of the network ports, said destination trunked port being coupled to said destination node via said data path; and trunked link load balancing means coupled to communicate with said routing means, said load balancing means for selecting a destination port associated with said packet from said subset of network ports of said destination trunked port;

whereby transmission loading of the aggregated network links of said trunk is balanced.

2. A communications network switch as recited in claim 1 wherein said load balancing means is responsive to a source port ID value indicating said source port, and is operative to select said destination port as a function of said source port ID value.

3. A communications network switch as recited in claim 2 wherein said packet routing, means includes a packet routing table which is responsive to said destination address value, and which is operative to provide a trunked port ID value indicating said destination trunked port.

4. A communications network switch as recited in claim 3 wherein said load balancing means comprises:

a system administration unit providing a plurality of port mapping values, each of said port mapping values being associated with a corresponding one of the network ports, each of said port mapping values including a plurality of port select values, each of said port select values being associated with a corresponding one of a plurality of trunked ports of the switch, each of said trunked ports including a corresponding subset of the network ports, each of said port select values indicating a corresponding selected one of said corresponding subset of network ports of said associated trunked port;

a trunk port configuration unit coupled to receive said port mapping values from said system administration unit, and including a plurality of configuration registers for storing corresponding ones of said port mapping values; and an address resolution circuit coupled with said trunk port configuration unit, and including,
a first multiplexer having a plurality of inputs for receiving corresponding ones of said port mapping values, a control port responsive to said source port ID value, and an output providing a selected one of said port mapping values in response to said source port ID value being applied to said control port of said first multiplexer,
a destination register coupled to said first multiplexer for storing said selected port mapping value, and having a plurality of outputs each providing a corresponding one of said port select values, and
a second multiplexer having a plurality of inputs coupled to said outputs of said destination register, a control port responsive to said trunked port ID value, and an output providing a selected one of said port select values in response to said trunked port ID value being applied to said control port of said second multiplexer, said selected port select value indicating said destination port.

5. A communications network switch as recited in claim 4 wherein said system administration unit comprises a processing unit and a computer readable memory unit, and wherein said port mapping values are programmable by a user.

6. A communications network switch as recited in claim 1 wherein said load balancing means is responsive to said source address value of said packet, and is operative to select said destination port as a function of said source address value.

7. A communications network switch as recited in claim 6 wherein said load balancing means comprises:

a register for storing said source address value of said packet, said register including at least one register output, each register output providing a port select value derived from said source address value, said port select value for indicating a selected one of a plurality of network ports of a destination trunked port associated with said packet.

8. A communications network switch as recited in claim 7 further comprising a multiplexer having a plurality of inputs for receiving corresponding one of said port select values, a control port responsive to a predefined bit select value, and an output providing a selected one of said port select values.

9. A communications network switch as recited in claim 1 wherein said load balancing means is responsive to said corresponding source and destination address values of said packet, and is operative to select said destination port as a function of said source and destination address values.

10. A communications network switch as recited in claim 9 wherein said load balancing means comprises:
- a first register for storing said source address value of said packet, said first register including at least one output providing a corresponding first value derived from said source address value,
- a second register for storing said destination address value of said packet, said second register including at least one output providing a second value derived from said destination address value,
- an exclusive NOR logic unit responsive to said first and second values, and operative to provide a port select value for indicating a selected one of a plurality of network ports of a destination trunked port.

11. A communications network switch as recited in claim 1 wherein the trunking network device is a high speed server having a network interface card providing for trunked link communication.

12. A communications network switch as recited in claim 1 wherein communication via the network links is implemented in accordance with ETHERNET.

13. A communications network switch as recited in claim 1 wherein each of the network links has a bandwidth of 100 Megabits per second, and each of the trunked links provides a bandwidth 400 Mbps.

14. In a communications network switch having a plurality of network ports for transmitting and receiving packets to and from network nodes via network links, the switch being operative to communicate with at least one trunking network device via a trunk including a plurality of aggregated network links, the trunk being coupled with a corresponding trunked port including a subset of the network ports that are coupled with corresponding ones of the aggregated network links of the trunk, a method for balancing the transmission loading on each of the links of the trunk, the method comprising the steps of:
- receiving a packet at a source port of the switch, said packet having a source address and a destination address indicating a destination node that is communicatively coupled with the switch via a data path including a trunk;
- determining a destination trunked port associated with said packet, said destination trunked port including a subset of the network ports, said destination trunked port being coupled to said destination node via said data path; and
- selecting a destination port associated with said packet from said subset of network ports of said destination trunked port.

15. In a communications network switch as recited in claim 14 wherein said step of selecting said destination port includes:
- receiving a source port ID value indicating said source port; and
- determining said destination port as a function of said source port ID value.

16. In a communications network switch as recited in claim 14 wherein said step of selecting said destination port comprises selecting said destination port as a function of said source address of said packet.

17. In a communications network switch as recited in claim 14 wherein said step of selecting said destination port comprises selecting said destination port as a function of said source address and said destination address of said packet.

* * * * *